United States Patent
Strathmeyer

(12) 
(10) Patent No.: US 6,201,805 B1
(45) Date of Patent: Mar. 13, 2001

(54) APPARATUS AND METHOD FOR COMPUTER TELEPHONE INTEGRATION IN PACKET SWITCHED TELEPHONE NETWORKS

(75) Inventor: Carl R. Strathmeyer, Reading, MA (US)

(73) Assignee: Dialogic Corporation, Parsippany, NJ (US)

( * ) Notice: Subject to any disclaimer, the term of this patent is extended or adjusted under 35 U.S.C. 154(b) by 0 days.

(21) Appl. No.: 08/955,834

(22) Filed: Oct. 21, 1997

(51) Int. Cl.[7] .............................. H04M 3/00; H04M 1/64
(52) U.S. Cl. ...................... 370/356; 370/352; 379/88.17
(58) Field of Search .................................... 370/352, 353, 370/354, 355, 356; 379/88.17

(56) References Cited

U.S. PATENT DOCUMENTS 5,867,494 * 2/1999 Krishnaswamy et al. ........... 370/352

* cited by examiner

Primary Examiner—Joseph L. Felber
(74) Attorney, Agent, or Firm—Kaplan & Gilman, LLP

(57) ABSTRACT

The technique is described whereby an external application computer can exercise call monitoring and control over calls in a packet network telephony environment, wherein a separate application computer is utilized to communicate with the gatekeeper computer already known in the art of packet network telephone communications, and wherein that gatekeeper computer is enhanced beyond the current art to implement the required communication protocol with the external application computer.

13 Claims, 4 Drawing Sheets

APPARATUS AND METHOD FOR COMPUTER TELEPHONE INTEGRATION IN PACKET SWITCHED TELEPHONE NETWORKS

TECHNICAL FIELD

This invention relates to computer telephone integration (CTI) and, more specifically, to an improved method and apparatus for utilizing CTI techniques in a packet switched telephone network.

BACKGROUND OF THE INVENTION

Telephony over packet networks, particularly over wide area networks such as the Internet, has received considerable attention in recent months. Specifically, scientists have begun exploring the possibility of sending voice and video information streams over packet switched data networks. The transmission of such information streams over packet switched networks can be more cost efficient than traditional telephony, which requires a dedicated circuit between the calling and called party.

Computer telephone integration has been widely applied to traditional telephony methods and apparatus, but has not as yet been successfully applied to the methods and apparatus used for packet network telephony. This invention specifies novel apparatus and methods, supplementary to known packet network telephony apparatus and methods, which enable CTI capabilities in such an environment.

One possible set of methods and apparatus for completing calls over a packet switched network, which calls can handle voice and other information streams, is defined by ITU recommendation H.323. The H.323 standard is available from the International Telecommunications Unit, Geneva and is incorporated herein by reference. The H.323 standard defines various protocols dealing with call control, call setup, call termination, and other similar techniques known to those in the packet network telephony art.

The H.323 standard defines a functional entity called a gatekeeper. The gatekeeper handles network functions such as bandwidth control, zone management, address translation, and admissions control for a designated set of network terminals. While all these functions are further defined in the previously incorporated standard, we set forth two examples below.

Bandwidth control provides a protocol by which the gatekeeper allocates a particular amount of network bandwidth to a particular connection. The gatekeeper can be contacted by either the calling or called party in order to change the amount of bandwidth allocated to a particular call.

As an another example, the gatekeeper performs zone management. This function, as further defined in the H.323 standard, provides a mechanism for allocating sets of different terminals and other nodes in the network to a particular gateway. The H.323 standard provides a mechanism for dynamically altering the allocation of different network nodes to different gatekeepers.

The gatekeeper function provides services analogous to the call processing function within a private branch exchange (PBX) in conventional telephony. In traditional telephony, CTI features are provided by creating an interface between external application software and the call processing function within the PBX. By contrast, in the known packet network telephony art, interfaces to the gatekeeper are only defined from other gatekeepers, end points, and other network entities.

SUMMARY OF THE INVENTION

The above and other problems of the prior art are overcome and a technical advance is achieved in accordance with the present invention which relates to a packet network telephony call processing device (e.g.; an H.323 gatekeeper) which is arranged to interface with a plurality of external call processing applications programs which may be located on one or more remote computers. In accordance with the teachings of the present invention, a call processing application computer is connected via a data network to a gatekeeper computer, and these two entities exchange messages in the manner specified by the invention. The gatekeeper computer may be located with one of the terminals or may be located on a separate computer.

The gatekeeper computer and applications computer(s) communicate with one another in order to perform various call control functions over the data network and to provide call information and control to a user of the applications computer. As packet switched telephone connections are set up between various terminals or other nodes, the gatekeeper communicates with one or more application computers in order to provide the call information and call control functions required by the computer telephony applications residing on the application computers. Examples of these functions include establishing and tearing down calls, transferring calls, call conferencing, associating the applications computer with one or more specific end points in the gatekeeper zone for monitoring and control, determining the state of calls at a given end point, and various other functions.

DETAIL DESCRIPTION OF THE PREFERRED EMBODIMENT

Figure 1:
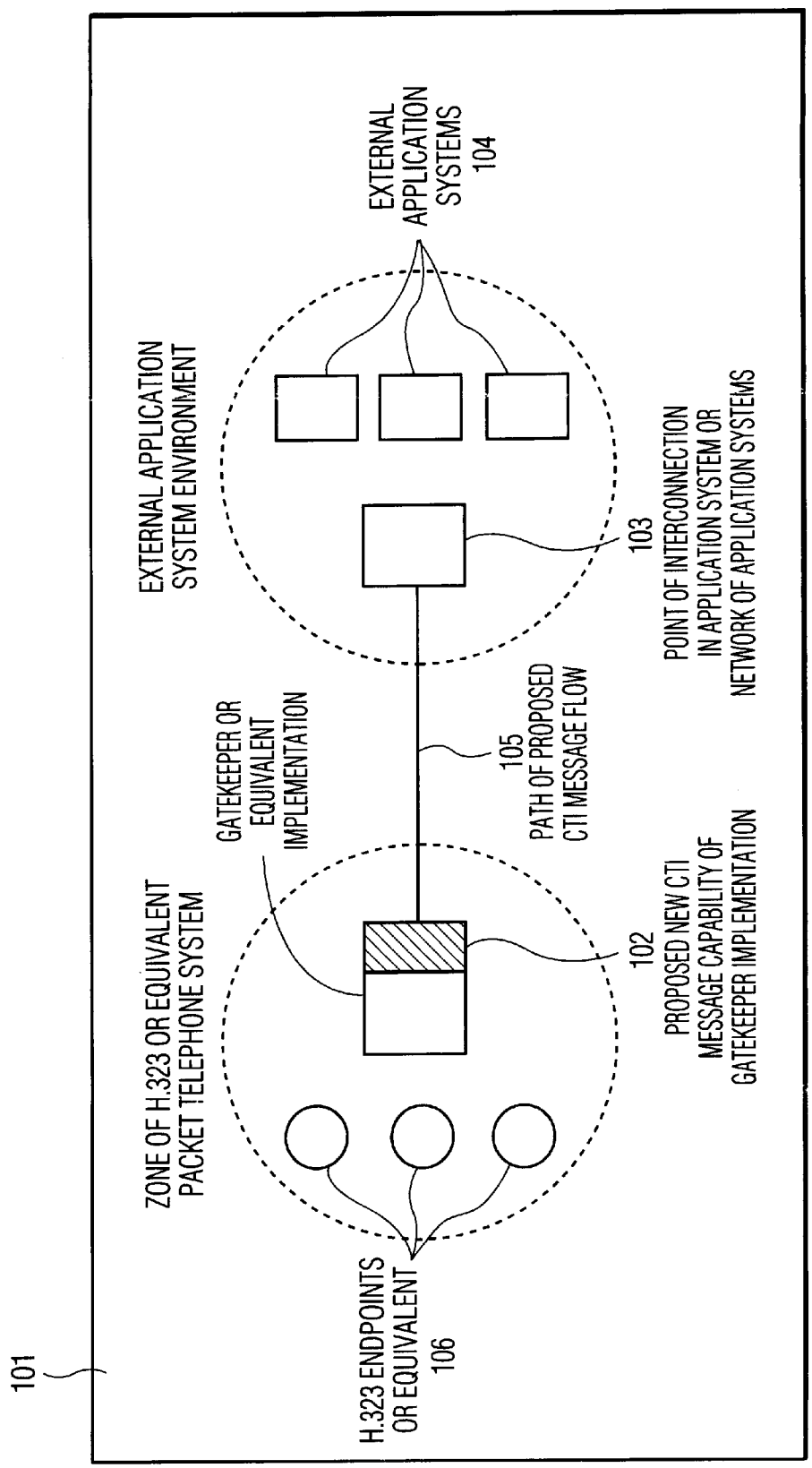
FIG. 1 shows a conceptual overview of an exemplary embodiment of the present invention as incorporated into a packet network telephony system.

FIG. 1 illustrates an overview of the interconnection of the gatekeeper computer 102 with the applications computer 103 according to the teachings of the present invention. To enable such interconnection, gatekeeper computer 102 is enhanced and extended by the addition of software whose functions are described below. Communications path 105 may be any type of data communications path.

The arrangement of FIG. 1 includes several external telephony applications systems 104, typically implemented as software, which may be located on applications computer 103 or on separate computers connected via any communications network to applications computer 103. Typically, the applications computer may be collocated with one of the end points described below.

The arrangement of FIG. 1 also includes end points 106, which may be personal computers, network computer devices (NCs), or any other node capable of interconnection to the packet network telephony environment.

In operation, a command is issued from an applications computer 103 requesting certain telephony services which will be described below. The message requesting such a service is transmitted through path 105 to gatekeeper computer 102 for processing. The message sent to gatekeeper 102 causes gatekeeper 102 to exchange appropriate signaling messages with other packet network telephony environment nodes in a manner as described for example in the incorporated H.323 standard. As a result of this sequence of events, the combined system is able to implement the call processing functionality requested by applications computer 103 on behalf of applications 104.

During operation, various call control functions requested by applications computer 103 are performed by the gatekeeper 102. Additionally, by making appropriate requests of gatekeeper 102, applications computer 103 may monitor the outcome of various call control functions and transmit such outcome to any of applications 104.

Figure 2:
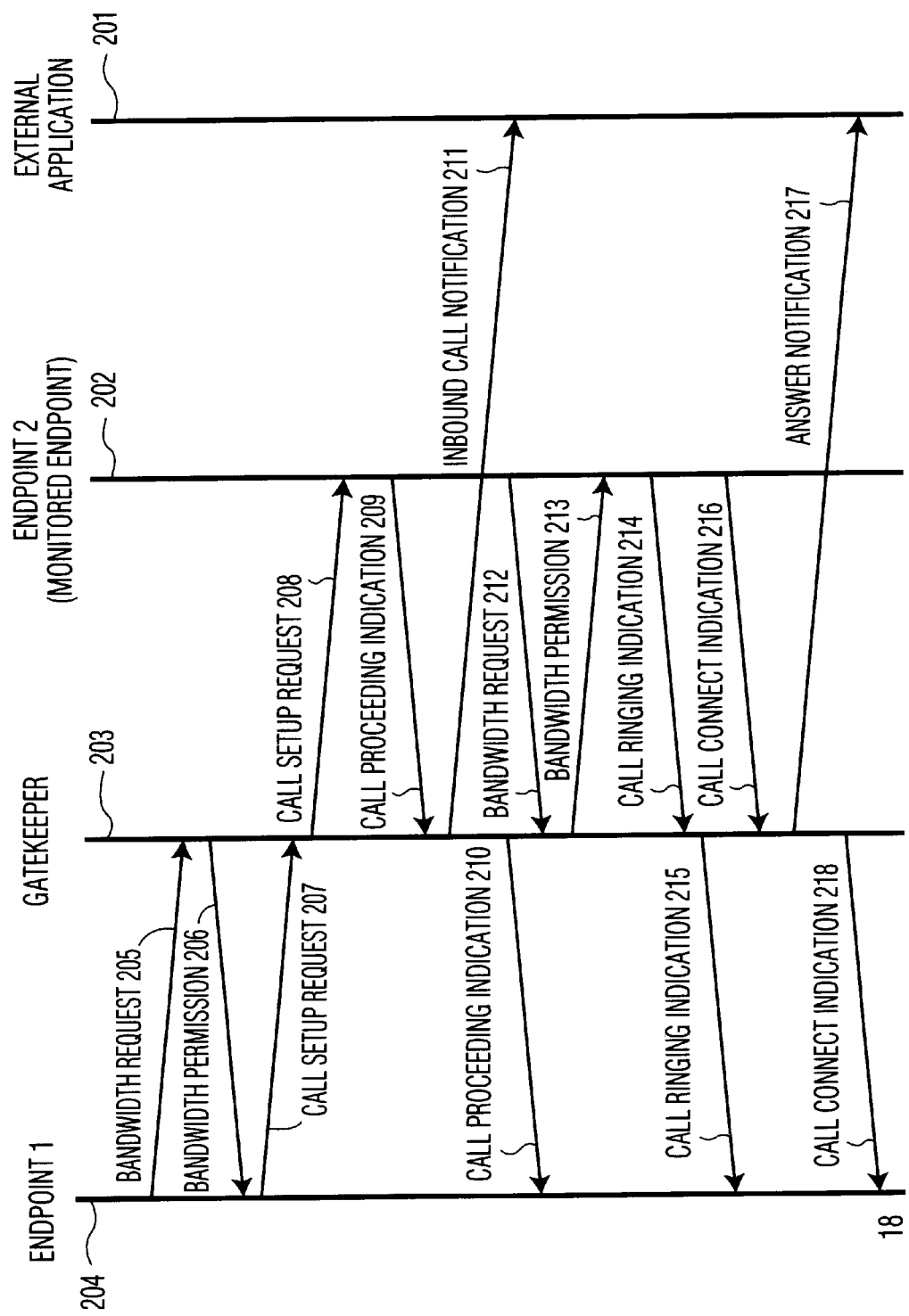
FIG. 2 shows exemplary message flow between system elements during the establishment of an inbound call that is detected by an external software application using the packet network telephony system as enhanced and extended by the present invention.

FIG. 2 shows an exemplary message flow diagram for detecting an inbound call from a remote end point to a local end point supervised by an external computer telephony application using the present invention. The specific example shown in FIG. 2 is the monitoring of an incoming call to end point 202 using packet network telephony methods and apparatus as described in the H.323 standard, enhanced by the present invention to permit the participation of an external software application 201. End points 202 and 204 represent audio terminals, for example, computer systems equipped as H.323 compliant telephone devices. Gatekeeper 203 is as described, for example, in the H.323 standard and as further enhanced by the present invention, and the external application 201 may be present on a separate computer as previously discussed.

In operation, the call initially proceeds according to the methods of the packet network telephony environment. A bandwidth request message 205 is sent to gatekeeper 203 and bandwidth is granted by the gatekeeper at message 206. A call setup request, message 207, is issued by the initiating end point 204, and gatekeeper 203 causes call setup request message 208 to be transmitted to receiving end point 202. A call proceeding message 209 is transmitted by the receiving end point back to gatekeeper 203 and relayed to initiating end point 210 as shown.

At approximately the same time gatekeeper 203 relays the call proceeding indication to the initiating end point using message 210, gatekeeper 203 also transmits to external application 201 a notification 211 that an inbound call is being received by the receiving end point 202. Gatekeeper 203 sends this message because external application 201 has previously indicated that it requires notification of telephony events occurring at receiving end point 202.

In order to connect the inbound call, receiving end point 202 requires network bandwidth, and such bandwidth is requested from and allocated by the gatekeeper 203 using messages 212 and 213. Next, the terminal at monitored end point 202 rings to alert the user to the arriving call, and an indication of such ringing is transmitted through messages 214 and 215 to initiating end point 204 through the gatekeeper 203. When the call is connected at the receiving end point 202 because of user action, end point 202 informs gatekeeper 203 via message 216.

At this point, gatekeeper 203 sends an answer notification to the external application 201 via message 217.

At approximately the same time, gatekeeper 203 indicates to the initiating end point 204 that the requested call has been connected via message 218.

In accordance with the protocol described hereinbefore, the detection of the call by an external application is accomplished via a protocol of messages transmitted between the gatekeeper and the end points to be connected, as well as between the gatekeeper 203 and the external application 201, thus enabling gatekeeper 203 to inform external application 201 regarding the progress of relevant calls in the packet telephony network.

Figure 3A:
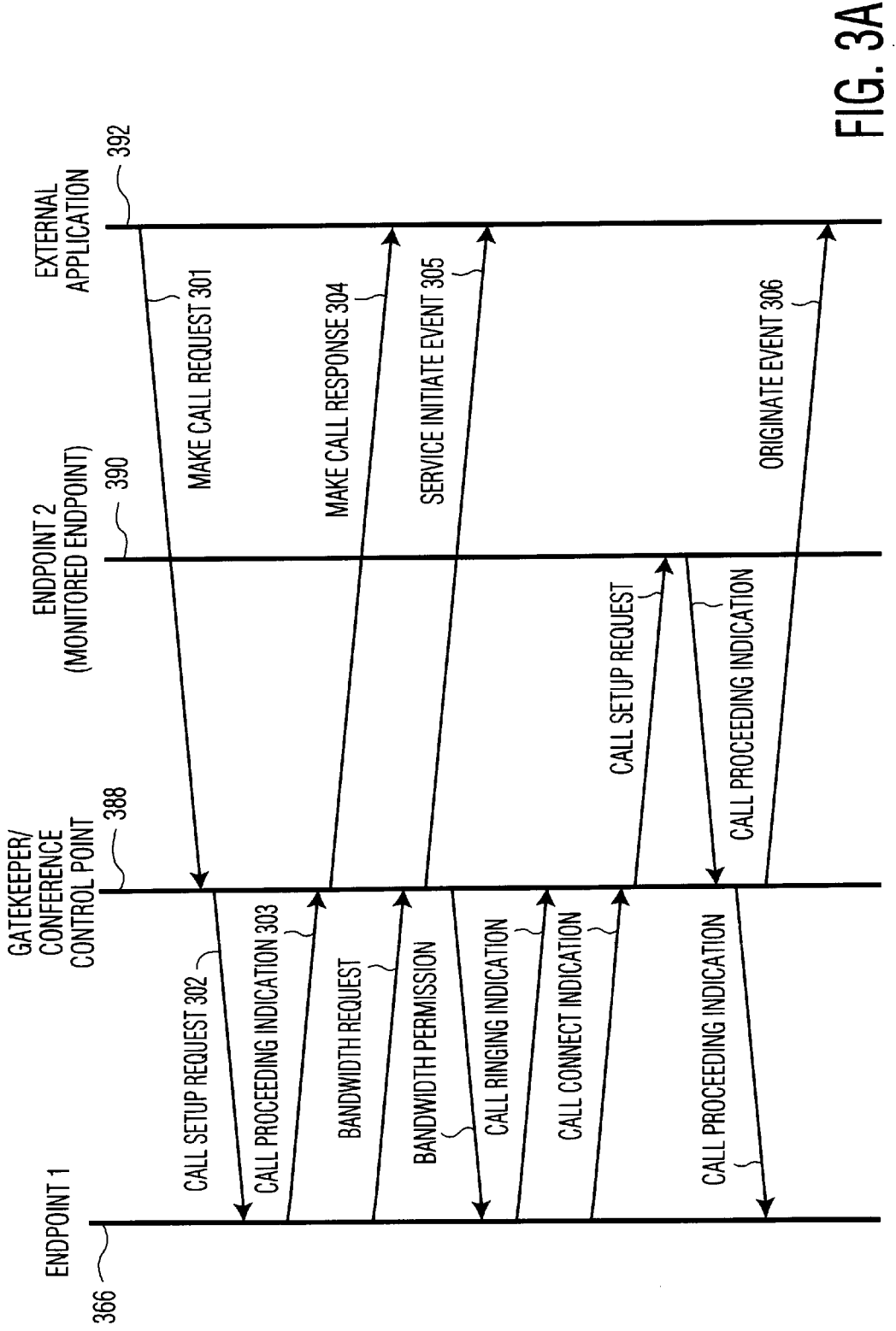
FIGS. 3A and 3B shows an exemplary message flow diagram utilizing the invention to establish an outbound call requested by an external software application in a similar environment.

FIGS. 3a and b show another example of an external call processing application requesting the establishment of an outbound call from initiating end point 386 to receiving end point 390. Many of the messages involved in this operation are substantially similar to those previously set forth with respect to the monitoring of the inbound call described in FIG. 2. New messages not previously discussed in FIG. 2 are described below. As with the discussion of FIG. 2, the external application 392 in FIGS. 3a and 3b is assumed to have previously communicated with gatekeeper 388 in accordance with other methods described by this invention to indicate its intention to issue call control requests with respect to initiating end point 386.

Figure 3B:
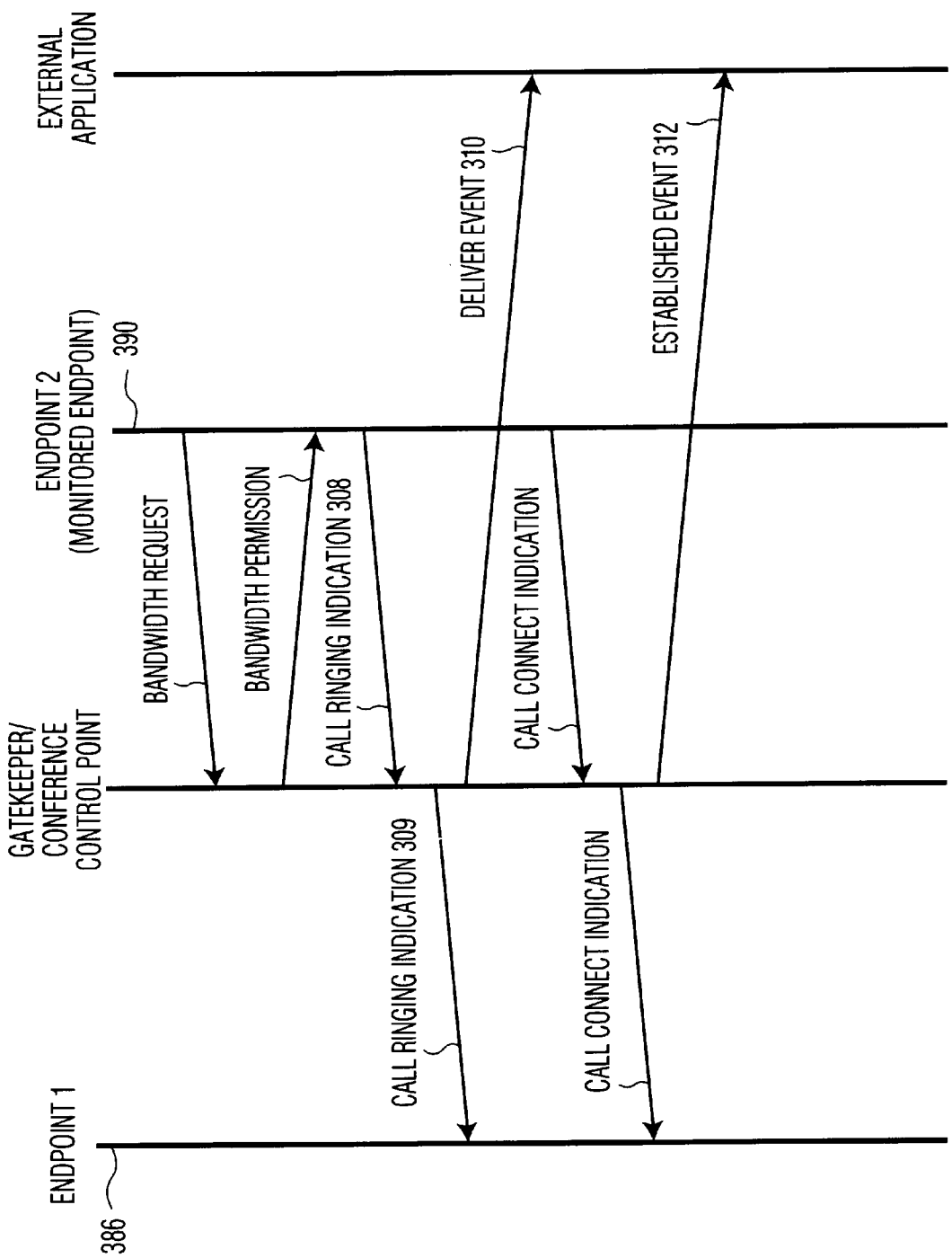

In FIGS. 3a and 3b, gatekeeper 388 also includes the conference control point function as currently known to the packet network telephony art. This function is used by the invention to interconnect two call segments, namely the segment between the initiating end point 386 and the conference control point; and between the conference control point and the receiving end point 390. The invention connects the call in two stages in order to overcome certain limitations of the known packet network telephony art. For clarity of description, the combined gatekeeper and conference control point apparatus is referred to as "gatekeeper 388".

The sequence of messages begins with a new message 301, specified by the current invention, through which the external application 392 makes a request that the first segment of the call be established from gatekeeper 388 to initiating end point 386.

Next, according to known packet network telephony art, messages 302 and 303 are exchanged between gatekeeper and initiating end point 386 in order to set up that first leg of the call.

Next, the gatekeeper 388 sends a new message 304 to external application 392 to alert it that the call request has been received and is being processed. Much of the remaining signaling, relating to the establishment of that segment of the call between initiating end point 386 and gatekeeper 388 in FIGS. 3a and 3b, is substantially similar to that previously described with respect to FIG. 2 and thus will not be repeated. Similarly, once the first leg of the call has been set up, gatekeeper 388 proceeds in similar fashion to set up the second leg of the call from itself to receiving end point 390.

However, during the process depicted in FIGS. 3a and 3b, gatekeeper 388 sends new messages to the external application 392 at relevant stages of call processing, including:

1. Message 305 indicating that initiating end point 386 has acquired the necessary network bandwidth to place the call;
2. Message 306 indicating that receiving end point 390 is processing the request for the call;
3. Message 310 indicating that receiving end point 390 is alerting its user to the arriving call; and
4. Message 312 indicating that receiving end point 390 has answered the call and a connection has been established.

The above describes the preferred embodiment of the invention. It will be appreciated however that various other modifications or additions will be apparent to those of ordinary skill in the art.

What is claimed is:

1. A method of setting up and monitoring a packetized telephone communications session between at least two nodes of a packet data network, comprising the steps of:

transmitting over a data network, from an application computer to a gatekeeper computer, information indicative of monitoring and control telephony functions desired by a user of said application computer, said application computer being located separately from any of said at least two nodes of said packet data network;

arranging for said packetized telephone communications session between said at least two nodes of said packet data network, said arrangement being accomplished through said gatekeeper computer;

causing said packetized telephone communications session between said at least two nodes of said packet data network to occur; and reporting information indicative of said session occurring to said application computer from said gatekeeper computer over said data network.

2. The method of claim 1 wherein said step of arranging comprises the following steps:

allocating bandwidth for at least a first endpoint of said packet data network;

notifying said application computer from said gatekeeper computer that said session is processing;

allocating bandwidth to at least a second endpoint to participate in said session;

connecting said second endpoint with said first endpoint; and notifying said application computer from said gatekeeper computer over said data network of said connection.

3. A method of completing a telephone call over a packet data network comprising:

transmitting over a data network, from an application computer to a gatekeeper computer, a request for a packetized telephone call between at least two endpoints, said application computer being located separately from any of said at least two endpoints;

in response to said step of transmitting, conveying setup packets from said gatekeeper computer to said at least two endpoints, said setup packets requesting call setup;

receiving at said at least two endpoints, said setup packets;

in response to said step of receiving, negotiating bandwidth reservation between each of said at least two endpoints and said gatekeeper computer; and in response to said step of negotiating, completing said packetized telephone call between said at least two endpoints.

4. Apparatus for arranging a packetized telephone call over a data network, comprising:

a gatekeeper, said gatekeeper able to allocate network resources of said data network for said packetized telephone call;

at least two endpoints between which said packetized telephone call takes place; and an application computer different from said at least two endpoints, able to communicate over said data network with said gatekeeper, said application computer further able to issue instructions to said gatekeeper, and said application computer still further able to receive from said gatekeeper status messages indicative of the status of said packetized telephone call.

5. A method of monitoring a packetized telephone call over a data network, said call being negotiated through a gatekeeper, said method comprising:

transmitting over said data network, from an application computer to said gatekeeper, messages indicative of packet telephony network endpoints or specifications of classes of calls for which monitoring information is required, said application computer being located separately from any of said endpoints;

transmitting over said data network, from said gatekeeper to said application computer, messages indicative of the status of calls matching said specifications thereby supplied, including information about parties participating in said calls and status of devices utilized for said calls; and utilizing said messages at said application computer to implement control application functions related to said calls.

6. A method of disconnecting a packetized telephone call occurring over a data network, said disconnection being negotiated through a gatekeeper, said method comprising:

transmitting over said data network, from an application computer to said gatekeeper, packetized messages indicative of said call to be disconnected, said application computer being located separately from packet telephony network endpoints involved in said call; and utilizing said messages at said gatekeeper to implement said disconnection between said endpoints.

7. A method of diverting a packetized telephone call being presented to a packet telephony network end point to an alternative end point, said diversion being negotiated through a gatekeeper of a data network, said method comprising:

transmitting, from an application computer to said gatekeeper, packetized messages indicative of said call to be diverted, said application computer being located separately from any of said end points; and utilizing said messages at said gatekeeper to implement said diversion.

8. A method by which an application computer connected to a data network can ascertain information indicative of (i) calls in progress at an endpoint of a packetized telephone call and (ii) parties involved in said calls, said information being supplied by a gatekeeper, said method comprising:

transmitting, from the application computer to said gatekeeper over said data network, packetized messages indicative of said calls or said endpoint for which said information is desired, said application computer being located separately from said endpoint; and transmitting, from said gatekeeper to said application computer over said data network, packetized messages containing the information desired by said application computer.

9. A method of transferring a packetized telephone call over a data network from one packet telephony network end point to another end point of said packet telephony network, said transfer being negotiated through a gatekeeper, said method comprising:

transmitting, from an application computer to said gatekeeper, packetized messages indicative of said call to be transferred, said application computer being located separately from any of said end points; and utilizing said messages at said gatekeeper to implement said transfer.

10. A method of adding an end point to a packetized telephone call over a data network, said addition being negotiated through a gatekeeper, said method comprising:

transmitting, from an application computer to said gatekeeper, packetized messages indicative of said end point to be added, said application computer being located separately from any endpoint involved in said call; and utilizing said messages at said gatekeeper to implement said addition.

11. A method of disconnecting a single end point from a packetized telephone call occurring over a data network, said disconnection being negotiated through a gatekeeper, said method comprising:

transmitting, from an application computer to said gatekeeper, packetized messages indicative of said end point to be disconnected, said application computer being located separately from any end point involved in said call; and utilizing said messages at said gatekeeper to implement said disconnection.

12. A method of placing a packetized telephone call occurring over a data network between at least two end points, on hold, said holding operation being negotiated through a gatekeeper, said method comprising:

transmitting, from an application computer to said gatekeeper, packetized messages indicative of said call to be placed on hold, said application computer being located separately from any of said endpoints involved in said call; and utilizing said messages at said gatekeeper to implement said hold.

13. A method of restoring a packetized telephone call from holding status over a data network, said restoration being negotiated through a gatekeeper, said method comprising:

transmitting, from an application computer to said gatekeeper, packetized messages indicative of said call to be restored from said holding status, said application computer being located separately from any endpoint involved in said call; and utilizing said messages at said gatekeeper to implement said restoration.

* * * * *